United States Patent
Kuhar

(12) 
(10) Patent No.: US 6,234,236 B1
(45) Date of Patent: *May 22, 2001

(54) CORDLESS BALANCED WINDOW COVERING

(75) Inventor: Otto Kuhar, Garfield, NJ (US)

(73) Assignee: Newell Operating Company, Freeport, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/497,849

(22) Filed: Feb. 4, 2000

Related U.S. Application Data

(63) Continuation of application No. 08/629,896, filed on Apr. 10, 1996, now Pat. No. 6,079,471, which is a continuation of application No. 08/303,773, filed on Sep. 9, 1994, now Pat. No. 5,531,257, which is a continuation-in-part of application No. 08/223,989, filed on Apr. 6, 1994, now Pat. No. 5,482,100.

(51) Int. Cl.⁷ .......................................... E06B 9/30
(52) U.S. Cl. ................ 160/170 R; 160/172; 160/168.1; 160/84.05
(58) Field of Search ................ 160/168.1 R, 170 R, 160/171 R, 172, 84.01, 84.04, 84.05, 192, 193, 305; 242/422.5, 615; 185/39, 45

(56) References Cited

U.S. PATENT DOCUMENTS

| | | |
|---|---|---|
| 13,251 | 7/1855 | Bixler . |
| 322,732 | 7/1885 | Lang . |
| 842,401 | 1/1907 | Goodill . |
| 927,090 | 7/1909 | Anderson . |
| 948,239 | 2/1910 | McManus . |
| 1,636,601 | 7/1927 | Givens . |
| 1,721,501 | 7/1929 | McKee . |
| 1,731,124 | 10/1929 | Carper . |
| 1,789,655 | 1/1931 | Toshi-Ko Iwata . |
| 1,951,659 | 3/1934 | Kesner . |
| 2,037,393 | 4/1936 | Roberts . |
| 2,049,518 | 8/1936 | Schier . |
| 2,110,983 | 3/1938 | Carver . |
| 2,175,549 | 10/1939 | Nardulli et al. . |
| 2,250,106 | 7/1941 | Lorentzen . |
| 2,260,101 | 10/1941 | De Falco . |
| 2,266,160 | 12/1941 | Burns . |
| 2,276,716 | 3/1942 | Cardona . |
| 2,324,536 | 7/1943 | Pratt . |
| 2,325,992 | 8/1943 | Wirthman . |
| 2,350,094 | 5/1944 | Butts . |
| 2,390,826 | 12/1945 | Cohn . |
| 2,410,549 | 11/1946 | Olson . |
| 2,420,301 | 5/1947 | Cusumano . |
| 2,509,033 | 5/1950 | Carver . |
| 2,520,629 | 8/1950 | Esposito . |
| 2,535,751 | 12/1950 | Nardulli . |
| 2,598,887 | 6/1952 | Burns . |
| 2,687,769 | 8/1954 | Gershuny . |
| 2,824,608 | 2/1958 | Etten . |
| 2,874,612 | 2/1959 | Luboshez . |

(List continued on next page.)

FOREIGN PATENT DOCUMENTS

| | | |
|---|---|---|
| 4003218 | 8/1991 | (DE) . |
| 2262324 | 11/1992 | (GB) . |

Primary Examiner—Daniel P. Stodola
Assistant Examiner—Bruce A. Lev
(74) Attorney, Agent, or Firm—Foley & Lardner

(57) ABSTRACT

A cordless, balanced Venetian blind or shade with a a spring motor includes conventional window covering components without the outside hanging lifting cords or cord locking mechanisms. one or more spring motors are employed. A cord spool, in the preferred embodiment, is coupled to one of the spring drums to serve to wind the cords to cause the blind to be raised or lowered, simply by manipulation of the bottom bar of the blind system. Due to the spring forces, the system compensates for the increasing weight on the cords as the window covering is raised and for the decreasing weight as it is lowered.

31 Claims, 4 Drawing Sheets

U.S. PATENT DOCUMENTS

| | | |
|---|---|---|
| 3,141,497 | 7/1964 | Griesser . |
| 3,194,343 | 7/1965 | Sindlinger . |
| 3,358,612 | 12/1967 | Bleuer . |
| 3,371,700 | 3/1968 | Romano . |
| 3,485,285 | 12/1969 | Anderle . |
| 3,487,875 | 1/1970 | Shukat et al. . |
| 3,756,585 | 9/1973 | Mihalcheca . |
| 3,817,309 | 6/1974 | Takazawa . |
| 4,157,108 | 6/1979 | Donofrio . |
| 4,205,816 | 6/1980 | Yu . |
| 4,223,714 | 9/1980 | Weinreich et al. . |
| 4,326,577 | 4/1982 | Tse . |
| 4,344,474 | 8/1982 | Berman . |
| 4,398,585 | 8/1983 | Marlow . |
| 4,574,864 | 3/1986 | Tse . |
| 4,610,292 | 9/1986 | Hausmann et al. . |
| 4,623,012 | 11/1986 | Rude et al. . |
| 4,625,786 | 12/1986 | Carter et al. . |
| 4,647,488 | 3/1987 | Schnebly et al. . |
| 4,726,410 | 2/1988 | Fresh . |
| 4,852,627 | 8/1989 | Peterson et al. . |
| 4,856,574 | 8/1989 | Minami et al. . |
| 4,862,941 | 9/1989 | Colson . |
| 4,877,075 | 10/1989 | Markowitz . |
| 4,880,045 | 11/1989 | Stahler . |
| 4,955,421 | 9/1990 | Torti . |
| 4,984,617 | 1/1991 | Corey . |
| 5,054,162 | 10/1991 | Rogers . |
| 5,067,541 | 11/1991 | Coslett . |
| 5,083,598 | 1/1992 | Schon . |
| 5,103,888 | 4/1992 | Nakamura . |
| 5,105,867 | 4/1992 | Coslett . |
| 5,133,399 | 7/1992 | Hiller et al. . |
| 5,141,041 | 8/1992 | Katz et al. . |
| 5,157,808 | 10/1992 | Sterner, Jr. . |
| 5,170,830 | 12/1992 | Coslett . |
| 5,184,660 | 2/1993 | Jelic . |
| 5,228,491 | 7/1993 | Rude et al. . |
| 5,313,998 | 5/1994 | Colson et al. . |
| 5,318,090 | 6/1994 | Chen . |
| 5,363,898 | 11/1994 | Sprague . |
| 5,391,967 | 2/1995 | Domel et al. . |
| 5,413,161 | 5/1995 | Corazzinni . |
| 5,482,100 * | 1/1996 | Kuhar ................................. 160/170 |
| 5,485,875 | 1/1996 | Genova . |
| 5,531,257 * | 7/1996 | Kuhar ............................... 160/168.1 |
| 6,056,036 * | 5/2000 | Todd et al. ....................... 160/84.05 |
| 6,079,471 * | 6/2000 | Kuhar ............................ 160/170 R |

\* cited by examiner

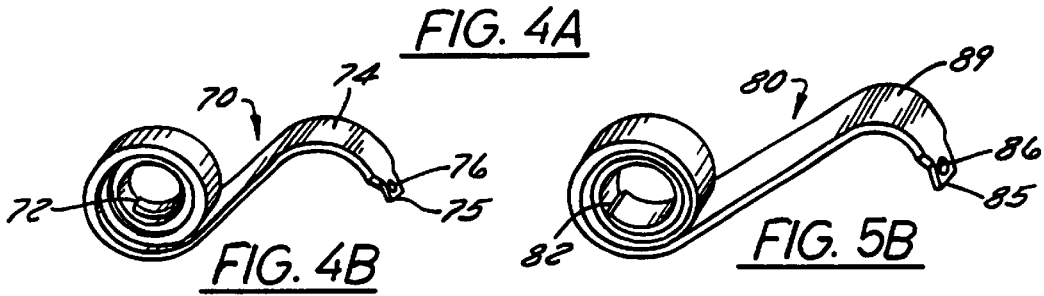
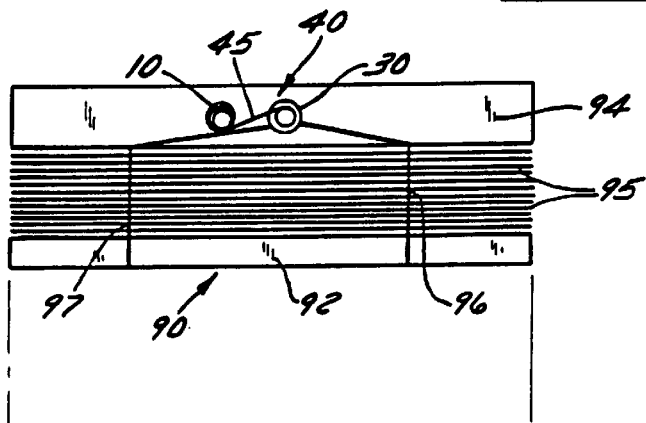
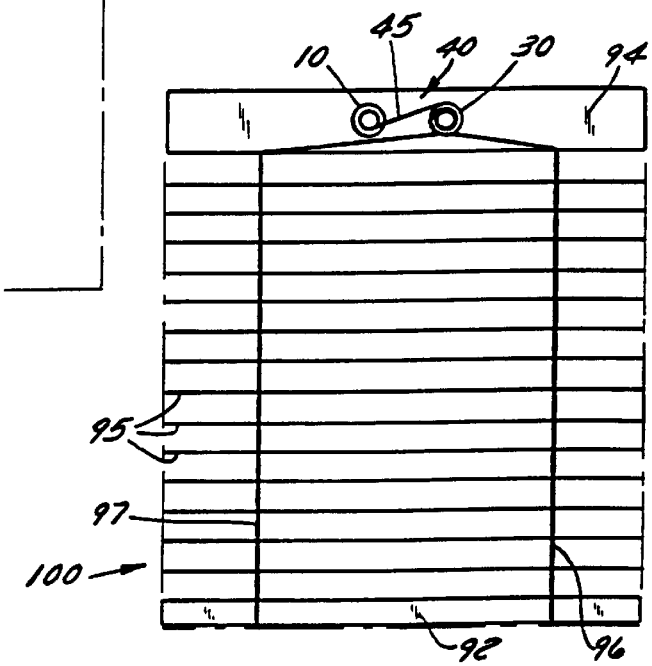

CORDLESS BALANCED WINDOW COVERING

CROSS-REFERENCES TO RELATED APPLICATIONS, IF ANY

The present invention is a continuation of U.S. patent application Ser. No. 08/629,896 filed Apr. 10, 1996 (CPA filed Nov. 26, 1999), now U.S. Pat. No. 6,079,471, which is a continuation of U.S. patent application Ser. No. 08/303,773 filed Sep. 9, 1994, now U.S. Pat. No. 5,531,257, issued on Jul. 2, 1996, which is a continuation-in-part of U.S. patent application Ser. No. 08/223,989, filed Apr. 6, 1994, now U.S. Pat. No. 5,482,100, issued on Jan. 9, 1996.

BACKGROUND OF THE INVENTION

1. Field of the Invention

The present invention relates generally to the art of spring motors useful for a variety of applications, including Venetian blinds and window shades. More specifically the present invention relates to a system in which lifting cords and cord locking mechanisms are eliminated from shades or blinds. Still more specifically, the invention relates to window covering systems which employ one or more constant or consistent, variable force springs to balance the weight of accumulated window covering material, depending upon the extent to which the blind or shade is raised or lowered. The present invention also relates to motorized blinds and shades.

2. Description of the Prior Art

Venetian blinds have been known for many years and typically include a plurality of slats made from metal, plastic, wood or other materials and supported by ladders. Such blinds typically include a bottom bar and a tilt mechanism to cause the slats to move from a horizontal position to a nearly vertical position to open and close the blinds with respect to the passage of light. It is also conventional with such systems to use lifting cords coupled to the bottom bar, passing through the slats and into mechanisms within the blind headrail. The cord is used to raise the bottom bar, accumulating individual slats as the bar is raised. Because of the natural tendency of the bar and accumulated slat weight to free fall, locking mechanisms are also commonly employed with such prior art devices. Pleated and other types of shades also include a bottom bar and similar raising, lowering, and cord locking mechanisms.

Several attempts have been made to eliminate the lifting cord locks, some of such attempts going back nearly 140 years. See, for example, Bixler, U.S. Pat. No. 13,251, issued Jul. 17, 1855 for "Inside Blinds." In this device, a pair of "fusees" are employed, namely spirally grooved pulleys, to wind a cord passing therebetween. The two fusees are arranged so that as a barrel spring is being wound the cord joining the fusees compensates for changes in spring force. A spool is provided for accumulation of the lifting cord.

U.S. Pat. No. 2,420,301, issued May 13, 1947 to Cusumano for "Venetian Blind" also employs a cone-shaped member with grooves and an elongate coil spring. This design dispenses with normal draw cords and provides a counterbalance so that the slats may be retained at any vertical position without a lock or anchorage and so that the blinds can be raised with relatively small effort.

A different device is shown in Pratt's U.S. Pat. No. 2,324,536 issued Jul. 20, 1943 for "Closure Structure." In this device, tapes and coil springs are employed to raise and lower a blind particularly suited for use in a vehicle such as a train. The complex structure disclosed in this patent is especially suitable for devices in which the bottom bar and the slats ride in tracks as they move upwardly and downwardly.

Other patents show various spring devices used with venetian blinds. For example, in Cohn's U.S. Pat. No. 2,390,826, issued Dec. 11, 1945 for "Cordless Venetian Blinds," two coil springs are used to provide even force, with a centrifugal pawl stop. The blind is raised by freeing the pawl to allow the spring to provide a lift assist. Other more conventional systems employing springs and ratchet and pawl mechanisms include those shown in Etten's U.S. Pat. No. 2,824,608, issued Feb. 25, 1958 for "Venetian Blind"; U.S. Pat. No. 2,266,160, issued Dec. 16, 1941 to Burns for "Spring Actuated Blind"; and U.S. Pat. No. 2,276,716, issued Mar. 17, 1942 to Cardona for "Venetian Blind."

Various attempts have also been made in the prior art to motorize blinds and shades. In most of these systems hard wiring is required because larger motors are required to move the bottom rail and accumulated window material.

None of the aforementioned patents disclose the use of spring motors of the type disclosed herein to eliminate the conventional pull cords and locks of venetian blinds or shades in a simple and easily adaptable mechanism having few components parts. A system which overcomes the disadvantages of the more complex and cumbersome systems of the prior art would represent a significant advance in this art.

SUMMARY OF THE INVENTION

The present invention features a cordless blind or shade in which a spring motor is used to eliminate conventional pull cord and cord-lock mechanisms.

The present invention also features a system in which either the spring strength or the number of spring motors may be altered, depending upon the size of the window covering. The invention further features techniques for increasing the friction on the cords used to raise and lower the blinds or shade to assist in maintaining a desired position against any spring force which may exist through the range of travel of the bottom bar.

The present invention still further features a system which is easy to adapt to a wide variety of blind or shade designs and sizes and the capability of applying spring forces in a variety of ways and combinations.

A different feature of the present invention is the use of spring motors and small electric motors to provide highly desirable automatic or remote controlled capabilities for shades and blinds.

How the present invention accomplishes these features will be described in the following detailed description of the most preferred embodiments, taken in conjunction with the FIGURES which illustrate blind systems, although shade applications are also enhanced by the present invention. Generally, however, the features are accomplished by employing constant force or consistent variable force spring motors in a blind or shade system, while eliminating conventional pull cord and associated cord-lock mechanisms. The features are accomplished by using springs wound on drums, the springs being of constant cross-section (constant force) or varying in width, thickness, or both along their length (variable force) whereby spring force imparted to a coiled spring is transferred from one drum to another. For these spring motors, such force is at its highest level when the blind or shade is fully raised, i.e., when the cords are supporting the full weight of the window covering. The spring force is at its lowest point when the window covering is fully lowered and, in the case of blinds, the slats are being individually supported by ladders, rather than by the cords, leaving only the bottom bar to be supported by the cord. In constant force systems, the spring force is substantially constant throughout the range of movement of its shade or blind bottom rack. The blinds and shades of the present invention may be manipulated by the operator simply grasping the bottom bar and urging it in an upward or downward direction.

The features of the present invention are also accomplished by providing selection criteria for the springs, to take into account the size and weight of a particular blind or shade or by adding additional spring motors for heavier or wider window coverings. To achieve greater certainty in maintaining desirable spring forces, in a most preferred, alternate form of the invention, the spring motors are interconnected to ensure that they operate in unison to provide a level action throughout the range of blind or shade travel. All of these features are accomplished in a blind or shade which will remain in the position selected by the user and which in a preferred embodiment may be motorized, e.g. by a small remote controlled DC motor. In an illustrated embodiment, friction imparting devices are, if necessary, used with the cords coupling the bottom bar and a spool within the headrail.

Other features of the invention, and other ways in which those features are accomplished, will become apparent to those skilled in the art after the detailed description of the most preferred embodiment is read and understood. Such other ways are deemed to fall within the scope of the invention.

DESCRIPTION OF THE DRAWINGS

FIG. 4A is a perspective view of a strip of spring material varying in width along its length;

FIG. 4B is a schematic view of the spring shown in FIG. 4A wound into a coil;

FIG. 5A is a schematic view of a spring varying in thickness along its length;

FIG. 5B is a view of the spring of FIG. 5A shown in a coiled position;

FIG. 6 is a schematic representation of a blind in the fully open position with the cord storage drum fully wound and a spring wound on its storage drum, the system thereby supporting the full weight of the slats and bottom bar;

FIG. 7 is a schematic illustration of the blind shown in FIG. 6, with the bottom bar in its fully lowered position and illustrating how the storage drum for the cords is substantially empty and the spring substantially transferred from its storage drum to its associated output drum.

In the various FIGURES, like reference numerals are used to indicate like components.

DETAILED DESCRIPTION OF THE PREFERRED EMBODIMENTS

Before proceeding with the detailed description of the preferred embodiments, several comments should be made about the applicability and the scope of the present invention. First, while venetian-type blinds are shown in certain of the FIGURES, the types of materials from which the blinds are made or the relative widths, heights and the configuration of the headrail, bottom rail and slats may vary widely. The present invention has applicability to a variety of such blinds. The present invention is also useful with window shades of various types since many-shade designs also use lifting cords and would benefit from the features of this invention. Whenever blinds are mentioned herein, shades should be considered a suitable alternative.

Second, while preferred types of springs are shown, one varying in width, another varying in thickness and a third being of constant cross-section, a combination of the three could be employed. Other spring configurations could also be used, in addition to those having a rectangular cross-section. For example, springs with round or oval cross-sections, decreasing along its length (for a variable force spring) or a laminated spring could also be employed.

Figure 3:
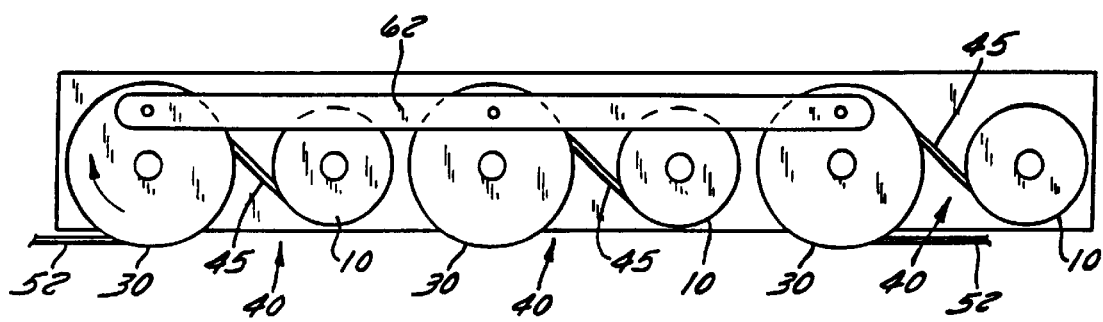
FIG. 3 is a schematic illustration of a combination of three spring motors, with the cord spools coupled together to ensure that all motors operate in unison.
Figure 10:
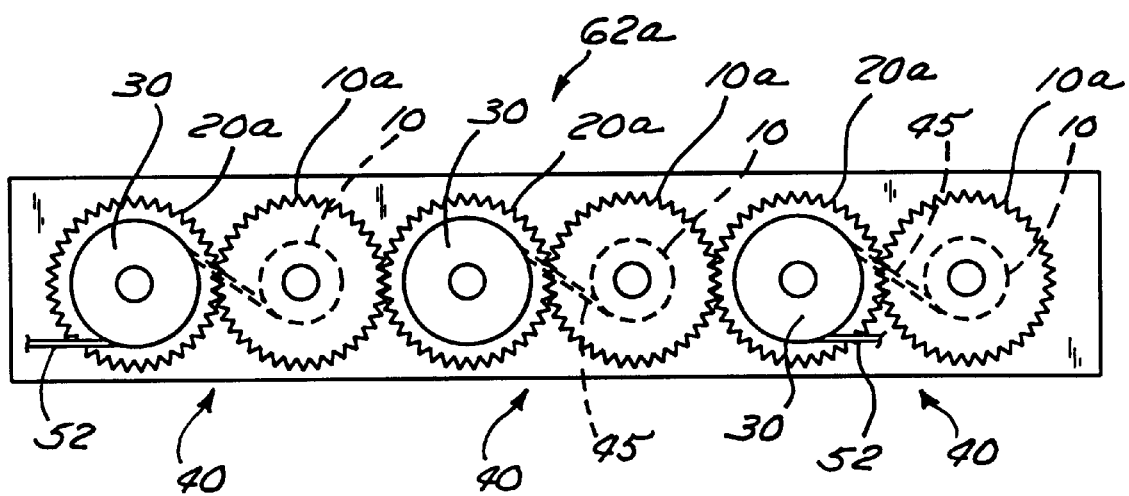
FIG. 10 is a schematic illustration of a combination of three spring motors, with each drum coupled together to ensure that all motors operate in unison.

Third, while one example is given of how to interconnect a plurality of spring motors, other techniques can be employed. For example, a gear system a gear system shown in FIG. 10 can be employed instead of the illustrated bar. The object of illustrative FIGS. 3 and 10 is to show how the spring motors can be made to operate in unison for level raising or lowering of the blind or shade, even if the lifting forces are applied off center. Ideally, however, the user should be instructed to apply the lifting or lowering force at, or relatively near, the center of the bottom rail to maintain desirable balance and to prevent slack from being created in the lifting cords.

Proceeding now to a description of the FIGURES, FIG. 1 is a perspective view of one storage drum 10 useful in the preferred embodiment. Storage drum 10 includes an axial hole 12, a cylindrically-shaped spring storage area 14, and a pair of walls 16 and 18 which taper upwardly and outwardly from area 14. This particular storage drum is especially suitable for a spring which varies in width, as will be described later in this specification. Drum 10 will be referred to herein as a storage drum, i.e. the drum on which the spring is initially coiled. The drum 10 would have parallel walls 16 and 18 for other embodiments such as for the springs illustrated in FIGS. 5A, 5B, 8A, and 8B.

Figure 1A:
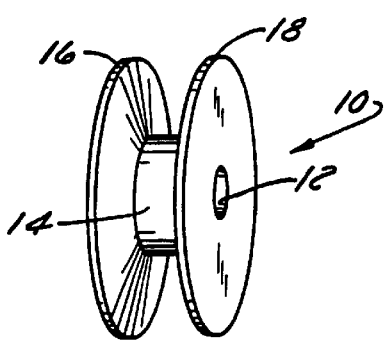
FIG. 1A is a perspective view of a spring storage drum useful in one preferred form of the present invention.
Figure 1B:
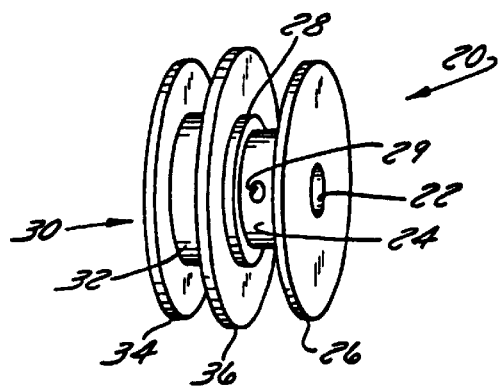
FIG. 1B is a perspective view of output drum, combined with a cord spool, useful in this preferred form of the present invention.

Proceeding next to FIG. 1B, an output drum is shown generally at 20 to include an axial hole 22, a cylindrical body 24, and a pair of walls 26 and 28. A hole 29 is provided on body portion 24, the purpose of which will become apparent shortly. Output drum 20 also includes a cord spool 30 having a central aperture (not shown) coaxial with hole 22, a body portion 32, and a pair of parallel side walls 34 and 36 defining an area therebetween for storage of the lifting cords.

Figure 2:
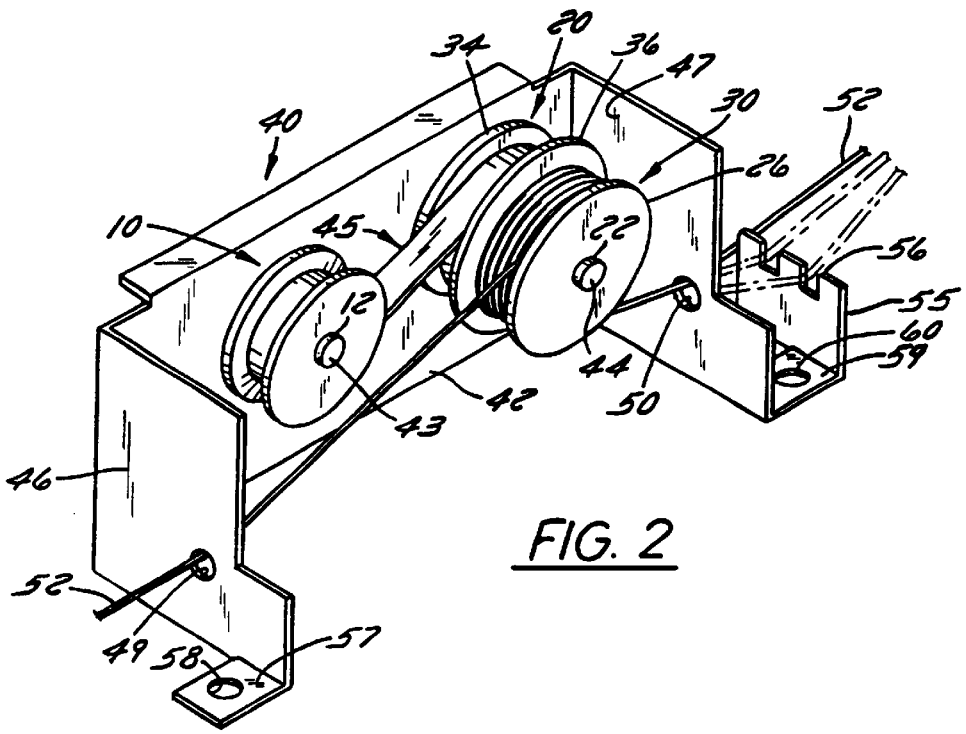
FIG. 2 is a schematic view of a spring motor together with one form of friction imparting device.

Proceeding next to FIG. 2, the arrangement of the devices in FIGS. 1A and 1B in a spring motor unit 40 is shown.

Motor unit 40 includes a bracket having a planar back wall 42 onto which the storage drum 10 and output drum 20 are rotatably mounted in a spaced apart orientation. Axles 43 and 44 pass respectively through the apertures 12 and 22 of the drums 10 and 20. From FIG. 2, it will be appreciated that output drum 20 is located adjacent wall 42, with the cord spool 30 located outwardly therefrom.

A spring is illustrated at 45 and is coupled between storage drum 10 and output drum 20. The spring itself will be described later. The spring motor unit 40 also includes a pair of surfaces 46 and 47, which are parallel to one another and perpendicular to surface 42, defining a generally U-shaped enclosure for the two drums and the cord spool. A hole 49 is provided in surface 46 and a hole 50 is provided in surface 47, with lifting cords 52 shown passing through each toward the cord spool 30. The illustrated motor unit 40 also includes another bracket component 55 spaced apart from surface 47 and including a plurality of slots 56 in its upper edge. Solid and dashed lines illustrate how the slots 56 may be used to increase the tension on the cord 52 traveling through portion 47 toward cord spool 30.

Finally, two attachment areas 57 and 59 are shown in FIG. 2, with holes 58 and 60, respectively. The latter are used for attachment of the bracket to the blind head bracket. Obviously, the location of the mounting holes can vary widely, depending on the overall configuration of the blind with which the spring force motor unit 40 is to be used.

Before proceeding to more detailed descriptions of the springs 45, reference should now be made to FIGS. 3 and 10, showing schematically how a plurality of spring motor units 40 may be coupled together, e.g. by an elongate bar 62 rotatably coupled to each of the respective cord spools 30 or by gearing 10*a* and 20*a* on the drums 10 and 20, respectively. It will be appreciated from FIG. 3, which is from a reverse perspective compared to that shown in FIG. 2, that the three spring motor units 40 will work in unison and the bar 62 will compensate for minor variations in spring forces which may exist for the individual springs 45 and ensure an even winding of the cords 52, even if the force to raise or lower the blind is applied off-center. Similarly, it will be appreciated from FIG. 10 that a gear system 62*a* will accomplish the same result as the bar 62. In FIG. 10, the bar 62 is shown removed and replace by the coupled gear system 62*a*. The gear system 62*a* comprises a plurality of gears 10*a* and 20*a* coupled respectively to the storage drums 10 and the output drums 20.

Proceeding next to the descriptions of FIGS. 4A and 4B, a preferred spring 70 is shown, again in perspective form. Spring 70 includes a first narrower end 72, a second wider end 74 and a coupling extension 75 having a hole 76 therein. The illustrated spring has a constant thickness. Spring 70, in use, is wound onto the storage drum in the configuration illustrated in FIG. 4B, i.e. with its narrower end coupled to body portion 14, and its wider end toward the outside. The extension 75 is attached to the body portion 24 of output drum 20 using hole 76 and any suitable fastener. The spring is wound from one drum to the other in an opposite coil orientation. In other words, as spring 70 is transferred from the storage drum 10 to the output drum 20, the width of the spring 70 between the two drums will decrease and the spring will be wound oppositely to its original coil shape.

Another embodiment of a spring useful in the invention is shown in FIGS. 5A and 5B, i.e. a spring 80 having a varying thickness. Spring 80 has a thinner first end 82, a thicker second end 89 having a width equal to that of end 82, and a coupling extension 85 having a hole 86 therein. The preferred coil orientation for spring 80 is shown in FIG. 5B, this time with the thinner end 82 at the core of the storage drum 10 and the thicker end 89 extending onto and around the output drum 20, using coupling extension 85 and hole 86. Again, the orientation of the spring, as it is transferred from the storage drum 10 to the output drum 20, is reversed.

While it has been mentioned earlier that springs of different configurations may be employed for variable force spring motors, it will now be more fully appreciated that one variation would be to use a spring which varies both in width and thickness. Also, a coil spring of circular cross-section or a laminated spring could be employed. The cross-section increasing from the end attached to the storage drum 10 to the end attached to the output drum 20.

Proceeding now to FIG. 6, the use of a spring motor unit 40 for a blind system 90 is shown. Blind system 90 includes a bottom bar 92, a headrail 94, and a plurality of slats 95 located therebetween. The ladders are not illustrated in these FIGURES but are conventional and, in and of themselves, do not form part of the present invention. The cords for raising and lowering bottom bar 94 are illustrated at 96 and 97 and are shown extending through the slats and toward the cord spool 30, which will be fully wound with cord when the blind is in the position illustrated in FIG. 6. Moreover, the storage drum would be wound with most of spring 45 and the output drum would be wound only to the extent desirable to attach its end and to provide the desired holding force.

Referring now to FIG. 7, the bottom bar 92 is shown in its fully lowered position with the individual slats 95 spaced from one another and with the cords 96 and 97 unwound from cord spool 30. At this point, the slats would be individually suspended from ladders (not shown) attached to the headrail 94, so that their weight is not being carried by the spring motor unit 40. It can be observed that the spring 45 has been substantially transferred from the storage drum 10 to the output drum 20, thereby decreasing the amount of force exerted on the bottom bar. In an ideal situation, the spring force will be just sufficient to prevent bottom bar 92 from self-raising.

When it is desired to open blind system 90, the bottom bar 92 is urged toward headrail 94, resulting in a spring driven rotation of the cord spool to wind cords 96 and 97. The spring will rewind back to storage drum 10, with an ever increasing level of force as the weight of the bottom bar 92 and accumulating slats 95 continues to increase. The operation is completed when the FIG. 6 configuration is achieved.

While the present invention has been described in connection with several illustrated embodiments, further variations may now be apparent. For example, instead of using only two cords (illustrated as 96 and 97 in FIGS. 6–7), additional cords could be used for wider blinds, as required.

In connection with experiments done to date, one suitable spring is made from Type 301 High-Yield Stainless Steel and has a length of 87 inches and a constant thickness of 0.005 inches. Its width increased from 0.110 inches at its narrow end to 0.312 inches at its wide end. For a coil diameter of 0.540 inches, a theoretical maximum torque of 0.650 pounds per inch was created, and the theoretical torque minimum was 0.230 pounds per inch.

In another example, a spring strip of the same length and material varied in thickness from 0.0029 inches to 0.0054 inches with the same coil diameter. The theoretical maximum torque was 0.819 pounds per inch, while the torque at the bottom (minimum) is reduced to 0.140 pounds per inch. It can be seen from these examples that the spring motor provides a variable force which is consistent in application, depending upon the particular position of the bottom rail or member with respect to the headrail. The theoretical forces may be readily calculated using formulas which are available from spring manufacturers in which the output force is determined by the formula:

$$F = \frac{E \cdot b \cdot s^3}{24 \cdot r^2}$$

where:
F=Output force
E=Modulus of elasticity
b=Width of spring strip
s=Thickness of spring strip
r=Constant coil radius.

It then becomes apparent that as the width or thickness varies from end to end of the strip, so also will the resultant force.

Figure 8A:
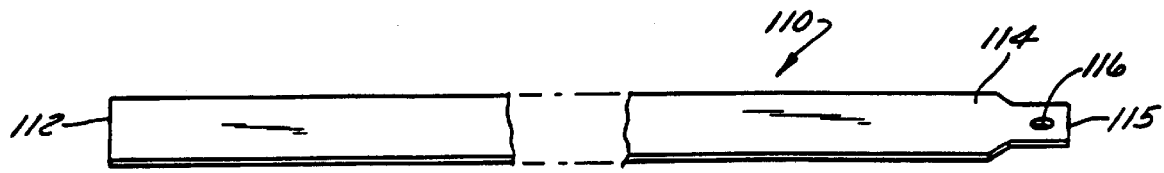
FIG. 8A is a perspective view of a strip of spring material being generally uniform in cross section along its length.
Figure 8B:
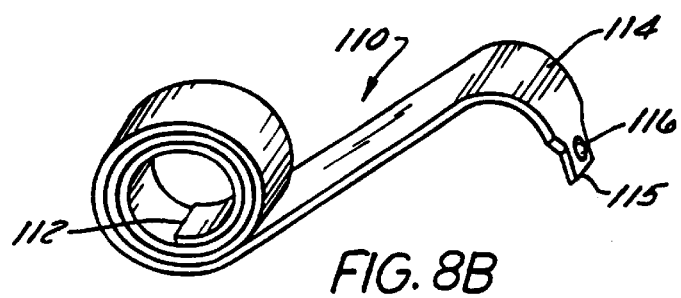
FIG. 8B is a schematic view of the spring shown in FIG. 8A wound into a coil.

FIGS. 8A and 8B show yet another embodiment of the present invention, this time where the spring 45 is a constant cross-section spring 110 having a first end 112, a second end 114, an extension 115 extending from the second end, and a hole 116 in the extension. The coiled form of spring 110 is shown in FIG. 8B.

It has been found that in some applications, for example applications where the blinds are short, or are made from very light materials, or where friction imparting devices are used with the cords that a constant force spring may be entirely suitable. This is true because while the weight exerted on the lifting cords 96 and 97 will vary as the blind is raised and lowered, frictional forces are present which can be sufficient to maintain the shade in any desired position without free fall. This particular embodiment could be enhanced using the friction imparting devices discussed in connection with FIG. 2. Accordingly, it can be readily seen that the present invention has extremely wide application and that the designer may make numerous choices depending upon the particular size of the blind, its construction materials, etc.

As with the other embodiments, several spring motors employing springs 110 can be coupled together, e.g. as is shown in FIG. 3. Alternatively, a plurality of such motors may be used which are not interconnected to one another.

Figure 9:
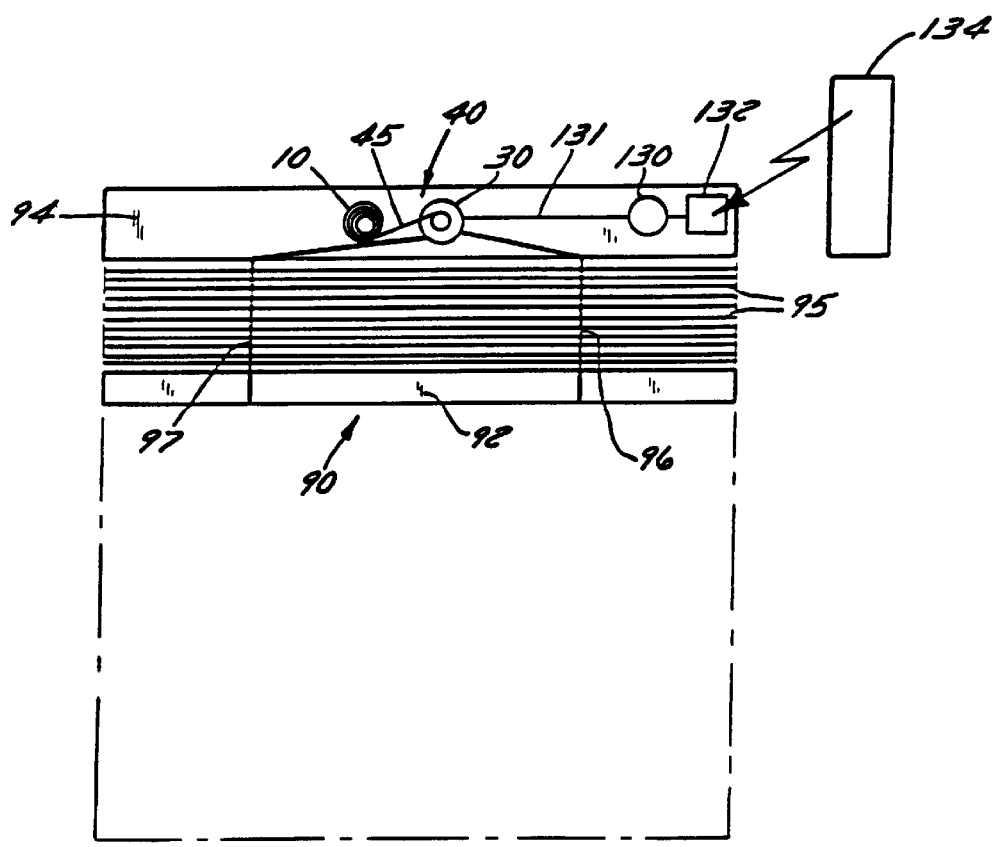
FIG. 9 is a view, similar to FIG. 6, but showing in schematic form a motor system for raising and lowering the blind.

FIG. 9 is a view, similar to FIG. 6, showing in schematic form a motor system for raising and lowering a blind. In order to facilitate understanding of the invention, like elements will be identified by like reference numerals in FIG. 9 and FIG. 6. Accordingly, in FIG. 9, a blind system 90 is illustrated having a spring motor unit 40 and cords 96,97 for raising and lowering bottom bar 92.

Also shown in FIG. 9 are a drive motor 130, and a control unit 132 for controlling operation of drive motor 130. Drive motor 130 is preferably an electrical motor which can drive in two directions and is operatively coupled with spring motor unit 40 by a coupling 131 to apply a drive force in either of two directions to move bottom bar 92 up or down. It is advantageous to use both spring motor unit 40 and drive motor 130 so that the force applied to blind system 90 by spring motor unit 40 augments and assists drive motor 130. Drive motor 130 may be operatively coupled anywhere in the driving mechanism of blind system 90. By such an arrangement a smaller, cheaper, and more energy-efficient drive motor 130 may be more advantageously employed with blind system 90 than could be employed alone without spring motor unit 40.

Control commands may be provided to control unit 132 for controlling operation of drive motor 130 from a remote position by hard-wired connection (not shown in FIG. 9) to a remote control unit such as remote control unit 134. In the alternative, remote control unit 134 may wirelessly communicate with control unit 132 by any of several methods, such as sonic coded signal patterns or optic coded signal patterns. The coding patterns may be coded transmission patterns, or coded frequency patterns, or combinations of such patterns.

In environments where there are a plurality of blind systems 90 which should be individually wirelessly controllable by one or more remote control units 134, respective blind systems 90 must be individually addressable. The required distinction among such a plurality of blind systems 90 may be encoded in each respective control unit 132 and recognized by remote control unit(s) 134 in any of several manners. For example, respective control units 132 may be user-coded by individual digital switches to assign a user-determined code to each respective blind system 90. Further, similar coding may be effected by embedding code in a read only memory (ROM) in each respective control unit 132, or by programming a code into a random access memory (RAM) in each control unit 132. A pin grid array or a jumper wire arrangement would also accomplish the desired coding, but such arrangements are susceptible to error and occupy large amounts of space.

Remote control unit 134 may similarly be encoded to selectively address a particular blind system 90: digital switch coding, ROM, RAM, and jumper-wiring may all be appropriate. Yet another approach involves factory preprogramming of systems. For example, a factory-provided library of codes may be programmed into a ROM in a remote control unit 134. A user may select a code from the library of codes for assignment to a respective blind system 90 by any of the above-described encoding mechanisms: e. g., digital switches, RAM, or the like. The user-selection may involve merely a two-digit entry or selection to identify an eight-digit (for example) digital code. By such an arrangement, the security of eight-digit coding and its protection against inadvertent operation of blinds is achieved with significantly less opportunity for errors in user-coding since the user needs only to enter two digits to identify/encode a particular blind system 90.

So while the invention has been described in connection with certain illustrative examples, it is not to be limited thereby but is to be limited solely by the scope of the claims which follow.

What is claimed is:

1. A balanced window covering system comprising:
a top members a covering material supported by the top member, a bottom member, and at least one cord extending between the bottom member and the top member, the cord supporting the bottom member in all positions between a lowered position and a raised position in which the bottom member is nearer the top member, wherein the covering accumulates on the bottom member when the bottom member is moved by the at least one cord toward the top member;
at least two spring motors, each spring motor having a predetermined spring force;
a coupler connecting the at least two spring motors, wherein the at least two spring motors connected together have a combined spring force; and
each cord being connected to the at least two spring motors, the combined spring force being sufficient, in combination with frictional forces and the weight of the bottom member and accumulated covering to inhibit the bottom member from moving toward or away from the top member.

2. The balanced window covering of claim 1, wherein each spring motor includes a coil spring.

3. The balanced window covering of claim 2, wherein each spring motor has a spring force that varies as the bottom member is moved relative to the top member.

4. The balanced window covering of claim 3, wherein each spring motor comprises a spring storage drum and a spring output drum and wherein the coil spring transfers from one drum onto the other as the bottom member is moved with respect to the top member.

5. The balanced window covering of claim 4, wherein the coil orientation of the spring as it is wound on the output drum is reversed as it is wound on the storage drum, whereby the spring forces of each spring motor is greatest when the bottom member is near the top member.

6. The balanced window covering of claim 4, wherein at least one cord storage spool is coupled to one of the drums to wind or unwind the at least one cord thereon as the bottom member is moved with respect to the top member.

7. The balanced window covering of claim 1, wherein the bottom member is a bottom rail and the cord comprises a pair of cords spaced from one another and extending to the top member.

8. The balanced window covering of claim 1, including a friction imparting surface associated with at least one of the spring motor and the cord.

9. The balanced window covering of claim 8, wherein the friction imparting surface includes a plurality of slots providing selective engagement surfaces for the cord, the frictional force being varied by selective engagement with one of the plurality of slots.

10. A spring motor unit for a balanced window covering including a top member for supporting a covering in a horizontal position, a bottom member, and a cord extending between the bottom member and the top member for supporting the bottom member as it is moved toward and away from the top member, wherein the covering accumulates on and is supported by the bottom member as the bottom member is moved toward the top member, the spring motor unit comprising:
 a coil spring having a spring force;
 a spring storage drum and a spring output drum, wherein the spring transfers from one drum onto the other as the bottom member is moved with respect to the top member; and
 a coupler configured to connect the storage drum or output drum to a respective storage drum or output drum of another spring motor unit.

11. The spring motor unit of claim 10, wherein the coupler is a gear system.

12. The spring motor unit of claim 11, wherein the gear system includes a gear on at least one of the drums.

13. The spring motor unit of claim 10, wherein the coupler is a bar.

14. The spring motor unit of claim 10, including a cord spool coupled to one of the drums to wind or unwind the cord thereon as the bottom member is moved with respect to the top member.

15. The spring motor unit of claim 14, wherein the spring is wound on the storage drum so that its first end is coupled to the storage drum and the motor is arranged to wind the second end of the spring onto the output drum as the bottom member is moved farther away from the top member.

16. The spring motor unit of claim 15, wherein the orientation of the spring on the output drum is opposite to the orientation of the spring on the storage drum, whereby its spring forces are greatest when the bottom member is near the top member.

17. A method for balancing a window covering including a top member for supporting the covering, a bottom member, and at least one cord extending between the bottom member and the top member for supporting the bottom member in all positions between a lowered position and a raised position wherein the bottom member is nearer the top member, and wherein the covering accumulates on the bottom member as the bottom member is moved toward the top member, the method comprising:
 preparing a bottom member and a window covering for a desired application;
 selecting a first spring motor unit having a predetermined spring force;
 coupling at least a second spring motor unit to the first spring motor unit to provide a spring force sufficient, in combination with frictional forces and the weight of the bottom bar to inhibit the bottom member from moving toward or away from the top member; and
 attaching the coupled spring motor units to the cord.

18. The method of claim 17, wherein coupling the first spring motor to the at least second spring motor includes connecting the spring motors through gears.

19. The method of claim 17, wherein coupling the first spring motor to the at least second spring motor includes connecting the spring motors with a bar.

20. The method of claim 17, further including applying sufficient friction to at least one of the spring motor units and the cord, the friction imparted being sufficient to inhibit the bottom member from moving toward or away from the top member.

21. The method of claim 20, wherein selecting a spring motor includes selecting a spring motor including a coil spring having a predetermined spring force.

22. The method of claim 21, wherein selecting a spring motor includes selecting a spring motor including a spring, a spring storage drum and a spring output drum, the spring being transferred from one drum onto the other as the bottom of member is moved with respect to the top member.

23. The method of claim 17, further including the step of selecting a bottom member having a given weight.

24. The method of claim 17, wherein selecting a spring motor having a predetermined spring force includes selecting a spring motor wherein the spring force increases as the bottom member is moved toward the top member.

25. A spring motor for a balanced window covering including a top member for supporting a covering, a bottom member, and at least one cord extending between the bottom member and the top member for supporting the bottom member in all positions between a lowered position and a raised position wherein the bottom member is nearer the top member, and wherein the covering accumulates on the bottom member when the bottom member is moved toward the top member the spring motor comprising:
 at least two spring motor units, each spring motor unit including a coil spring having a predetermined spring force, and a spring storage drum and a spring output drum, wherein, the spring transfers from one of the drums onto the other as the bottom member is moved with respect to the top member; and
 a coupler configured to connect at least one of the drums of each spring motor unit to another spring motor unit.

26. The spring motor of claim 25, wherein the coupler is a gear system.

27. The spring motor of claim 26, wherein the gear system includes gears on the drums.

28. The spring motor of claim 25, wherein the coupler is a bar.

29. The spring motor of claim 25, including a cord spool coupled to one of the drums to wind or unwind cord thereon as the bottom member is moved with respect to the top member.

30. The spring motor of claim 29, wherein the spring is wound on the storage drum so that its first end is coupled to the storage drum and the spring motor is arranged to wind the second end of the spring onto the output drum as the bottom member is moved farther away from the top member.

31. The spring motor of claim 30, wherein the coil orientation of the spring as it is wound on the output drum is reversed as it is wound on the storage drum, whereby the spring forces of each spring motor is greatest when the bottom member is near the top member.

* * * * *